United States Patent
Henderson et al.

(10) Patent No.: US 7,333,502 B2
(45) Date of Patent: Feb. 19, 2008

(54) SERVICES PROCESSOR HAVING A QUEUE OPERATIONS UNIT AND AN OUTPUT SCHEDULER

(75) Inventors: Alex E. Henderson, Hillsborough, CA (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 1107 days.

(21) Appl. No.: 10/358,992

(22) Filed: Feb. 4, 2003

(65) Prior Publication Data

US 2003/0154328 A1    Aug. 14, 2003

Related U.S. Application Data

(60) Provisional application No. 60/354,405, filed on Feb. 4, 2002.

(51) Int. Cl.
*H04L 12/54* (2006.01)
(52) U.S. Cl. ........................ 370/429; 370/412
(58) Field of Classification Search ................ None
See application file for complete search history.

(56) References Cited

U.S. PATENT DOCUMENTS

| 5,835,494 | A | | 11/1998 | Hughes et al. |
| 6,005,866 | A | * | 12/1999 | Lincoln ...................... 370/398 |
| 6,032,207 | A | * | 2/2000 | Wilson ........................ 710/54 |
| 6,374,339 | B2 | * | 4/2002 | Iivonen ...................... 711/170 |
| 6,477,144 | B1 | | 11/2002 | Morris et al. |
| 6,532,213 | B1 | | 3/2003 | Chiussi et al. |
| 2002/0075799 | A1 | * | 6/2002 | Bennett ...................... 370/229 |
| 2002/0154634 | A1 | * | 10/2002 | Basso et al. ................ 370/390 |

OTHER PUBLICATIONS

PCT Written Opinion, Mailing Date Nov. 13, 2003, International Application No. PCT/US03/03281.

* cited by examiner

*Primary Examiner*—Chi Pham
*Assistant Examiner*—Phuc Tran
(74) *Attorney, Agent, or Firm*—Blakely, Sokoloff, Taylor & Zafman LLP

(57) ABSTRACT

In a services processor, a queue operations unit controls the output of processed data packets from the services processor. In accordance with a hybrid list/calendar queue priority scheme, the queue operations unit uses a unique data structure comprising a tree of calendar arrays and queue lists to schedule the data packets for output.

7 Claims, 5 Drawing Sheets

SERVICES PROCESSOR HAVING A QUEUE OPERATIONS UNIT AND AN OUTPUT SCHEDULER

CROSS REFERENCE TO RELATED APPLICATIONS

This application claims the benefit of U.S. Provisional Application No. 60/354,405, filed Feb. 4, 2002, which is hereby incorporated in its entirety by reference.

BACKGROUND

1. Field of the Invention

This invention relates to the processing of data with a services processor, and in particular to the queuing and scheduling of data packets using suitable data structures.

2. Background of the Invention

When data are to be processed by a computing device, a system, such as a data filtering engine, is needed to classify or filter such incoming data. For example, in a computer network, data transferred from one network device to another network device via the computer network are typically broken down into smaller blocks of data called packets. For a networking device to process an incoming packet, the device must filter or classify the incoming packet so it can determine what action should be taken on the packet. Packet filtering is a basic requirement of networking devices such as routers, upper layer switches, firewalls, and bandwidth managers. Once data packets are filtered and processed, they are output for use by the networking device.

Existing services processors are not capable of processing packets out of order. Moreover, existing systems have inefficient schemes for scheduling and queuing the output of processed data packets. What are needed are a system and method for filtering data that can quickly and inexpensively filter the data, process the data, and output the data for use by other devices on the network. More particularly, what are needed are techniques for queuing and scheduling the output of processed data packets from a services processor.

SUMMARY OF THE INVENTION

In a services processor, a queue operations unit controls the output of processed data packets from the services processor. In accordance with a hybrid list/calendar queue priority scheme, the queue operations unit uses a unique data structure comprising a calendar queue and a tree of bit map arrays and queue lists to schedule the data packets for output.

In one embodiment, a data structure comprises a set of bit maps arranged into a hierarchy. Each bit map in the lowest layer is associated with a bucket in a calendar queue and tracks the state of the bucket. The upper layer bit maps in the hierarchy are associated with a group of lower layer bit maps, and thus a group of buckets. A bucket pointer array includes a pointer associated with each bucket. Queues are added to and removed from the calendar queue using the bit map hierarchy and the bucket pointer array. The system allows for queues to be outputted once the current time reaches the conformance time of their corresponding bucket.

In another embodiment, a method for scheduling data packets for output by a services processor comprises organizing the data packets into a plurality of queues, scheduling the plurality of queues for output according to a calendar queue, and outputting the queues according to the calendar queue. The calendar queue is defined by a data structure comprising a hierarchy of bit maps having at least an upper layer and a lower layer, each bit map on the lower layer associated with a bucket of the calendar queue, and a bucket pointer array including a pointer for each bucket, the bucket pointer array associating the queues with a bucket in the calendar queue.

In yet another embodiment, a device for scheduling data packets for output according to a calendar queue comprises a queue operations unit, a memory, and an output scheduler. The queue operations unit organizes the data packets into a plurality of queues, and the memory stores a data structure that defines the calendar queue. The data structure comprises a hierarchy of bit maps having at least an upper layer and a lower layer, each bit map on the lower layer associated with a bucket of the calendar queue, and a bucket pointer array including a pointer for each bucket, the bucket pointer array associating the queues with a bucket in the calendar queue. The output scheduler adds each queue to a bucket of the calendar queue to schedule plurality of queues for output according to the calendar queue.

DETAILED DESCRIPTION OF THE PREFERRED EMBODIMENTS

Figure 1:
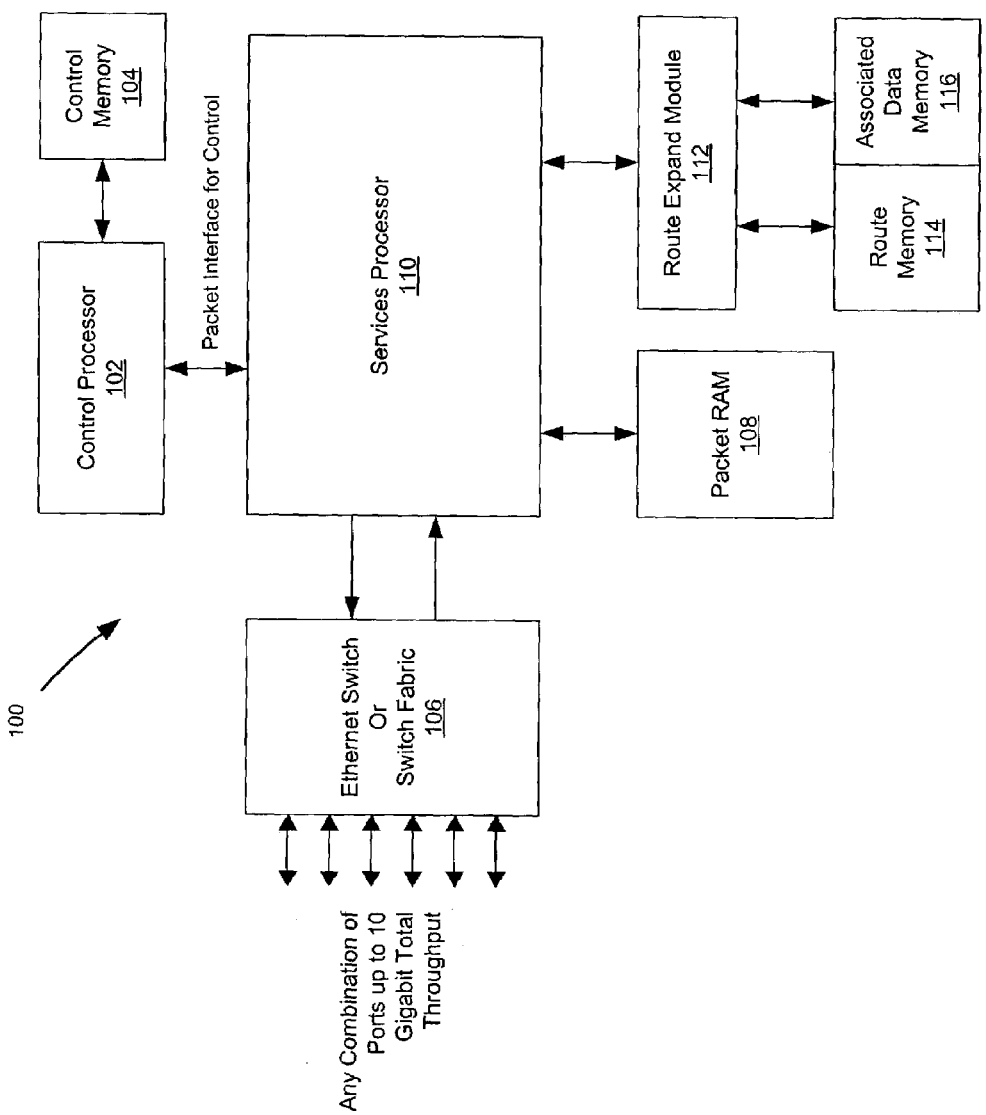
FIG. 1 is a diagram of an exemplary configuration a services processor coupled to a network.

Referring now to FIG. 1, an exemplary use of a full duplex, multiple port services processor 110 according to the present invention is shown. FIG. 1 illustrates the services processor 110 as part of a highly integrated Ethernet MAN access switch 100 with a 10 gigabit aggregate throughput. While present invention will be described in this context, those skilled in the art will recognize that the services processor 110 of the present invention can be designed for other data rates and has a variety of other uses including but not limited to being part of multi-service switches, metro switches, content switches, stateful firewalls, network probes enterprise routers, multi-protocol routers, Label Edge Routers (LER) and Label Switched Routers (LSR) (IP routers), wireless base stations, bandwidth managers, DSLARs and fast firewalls. As shown in FIG. 1, the Ethernet MAN access switch 100 preferably comprises a control processor 102, a control memory 104, an Ethernet switch or switch fabric 106, a packet memory 108, the services processor 110, a route expand module 112, a route memory 114, and associated data memory 116.

The control processor 102 is coupled to the services processor 110 by a packet interface and to the control memory 104 by a memory bus. The control processor 102 provides routing and switching protocol support for the services processor 110. The control processor 102 uses the packet interface for control plane functions such as configuration and event messages. Packets can also be sent to and received from the services processor 110 by the control processor 102 using the control plane. Thus, the operations and processing performed by the services processor 110 can be fully controlled using the control processor 102 and routines stored in the control memory 104.

The services processor 110 provides advanced switching functions (VPLS bridging, IP routing, fire walling, content switching including TCP termination) and feature processing (ACL and Subscriber Management) in this example. The services processor 110 is responsible for processing the packets to provide the appropriate routing and filtering as prescribed by the control processor 102. The services processor 110 is coupled to the Ethernet switch 106 for receiving and sending such packets. The services processor 110 is also coupled to the packet memory 108. The packet memory 108 is used to store packets prior to, during and after processing by the services processor 110. Finally, the services processor 110 is also coupled to the route expand module 112 that in turn is coupled to the route memory 114 and the associated data memory 116. The route expand module 112 is used to access large tables used by the services processor 110. For example, tables such as large label tables, route tables, and flow ID tables are stored in the route memory 114 and the associated data memory 116, and can be retrieved into a cache of the services processor 110 by the route expand module 112. One embodiment of this is described in patent application Ser. No. 60/402,359, filed Aug. 8, 2002, titled, "Tree Data Structure With Range-Specifying Keys and Associated Methods and Apparatuses," which is incorporated by reference.

Figure 2:
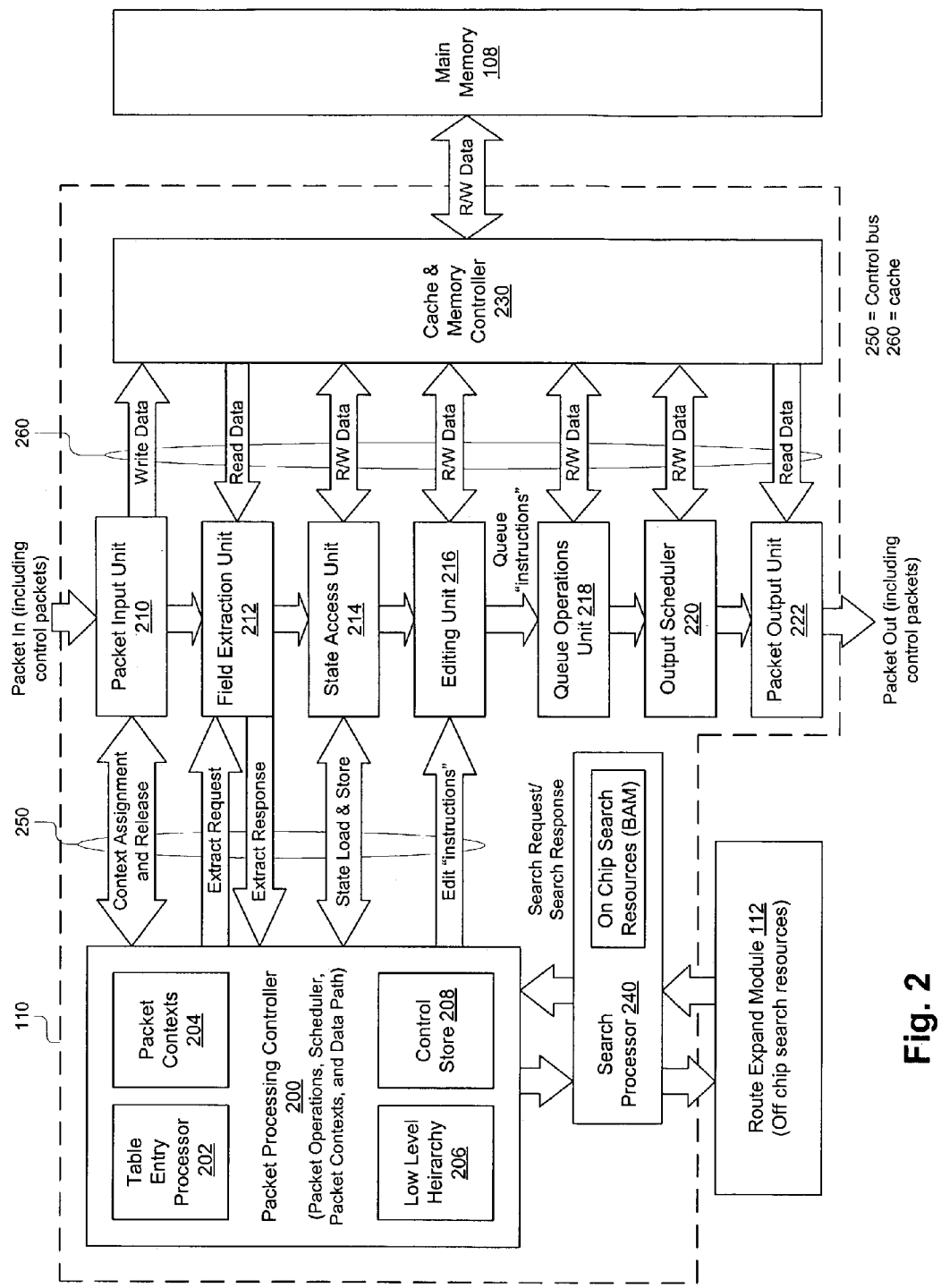
FIG. 2 is a diagram of one embodiment of a services processor architecture.

Referring now to FIG. 2, one embodiment for the services processor 110 is shown in more detail. Specifically, FIG. 2 shows the components of the services processor 110 and their coupling to the route expand module 112, and the main memory 104/108. In one embodiment, the services processor 110 is manufactured as a single integrated circuit with the route expand module 112, and a main memory 104/108 being separate integrated circuit chips. In the embodiment shown, the services processor 110 preferably comprises a packet processing controller 200, a packet input unit 210, a field extraction unit 212, a state access unit 214, an editing unit 216, a queue operations unit 218, an output scheduler 220, a packet output unit 222, a cache and memory controller 230, and a search processor 240. The packet processing controller 200 is coupled by a control bus 250 to the packet input unit 210, the field extraction unit 212, the state access unit 214, and the editing unit 216. The cache and memory controller 230 is coupled to the packet input unit 210, the field extraction unit 212, the state access unit 214, the editing unit 216, the queue operations unit 218, the output scheduler 220, the packet output unit 222 by a cache bus 260.

The packet processing controller 200 controls the operation of the services processor 110 in its processing and filtering of packets. The packet processing controller 200 is a control engine that controls the packet input unit 210, the field extraction unit 212, the state access unit 214, and the editing unit 216 as will be described in more detail below. The packet processing controller 200 preferably uses a table driven approach to control how packets are processed. The packet processing controller 200 preferably includes a table entry processor 202, one or more packet contexts 204 for each packet being processed, a low level hierarchy 206 and a control storage area 208. The low level hierarchy 206 and the control storage area 208 are part of the working memory of the packet processing controller 200 and provide additional areas for storing data need to process a packet.

The table entry processor 202 is part of the packet processing controller 200 and in response to commands by the table entry processor 202, the packet processing controller 200 issues control signals on the control bus 250 to the packet input unit 210, the field extraction unit 212, the state access unit 214, the editing unit 216, and/or issue instructions to the search processor 240. Execution of the table driven program by the table entry processor 202 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

The table entry processor 202 retrieves program entries through use of the search processor 240 and then processes the entries and sends command signals to the packet processing controller 200. In response, the packet processing controller 200 issues control signals on the control bus 250 to the packet input unit 210, the field extraction unit 212, the state access unit 214, the editing unit 216, and/or issue instructions to the search processor 240. Execution of the table program entry by the table entry processor 202 within the packet processing controller 200 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

A separate packet context 204 is used by the packet processing controller 200 for each packet as that packet traverses through the packet input unit 210, the field extraction unit 212, the state access unit 214, and the editing unit 216. The packet context 204 is a register set that keeps track of information associated with a packet while that packet is being processed. The packet context 204 includes several different kinds of registers. The packet context 204 preferably includes registers that determine which tables are currently controlling packet processing (analogous to a program counter in a CPU), and where in a packet the various protocols start (Encapsulation Pointers). For example, the packet context 204 includes registers with the following functions: a next instruction register that points to the next instruction to be processed for this packet context, multiple instruction registesr are used to create an instruction stack to support action and lookup tables analogous to subroutines in a CPU; a table handle register that points to the next lookup table to be processed in this packet context; a search result register that contains the result of the last search issued; a packet handle register that points to the packet associated with this packet context; one or more encapsulation pointer registers that acts as index registers for access to data in the packet pointed to by the packet handle register; one or more edit registers used by a packet editor to assemble complex edits that are applied to the packet; one or more key registers used to assemble multi-field search keys; one or more State Record Handle Registers used to access state data and a packet/context template handle used to access a block of packet buffer memory to load multiple registers in the packet context, as the source for a create packet operation, and as the source for a add encapsulation operation.

The packet processing controller 200 is also coupled to search processor 240 to send search requests and receive search responses. The search processor 240 is coupled to and interfaces with the route expand module 112 to retrieve data stored in the memories 114, 116 associated with the route expand module 112. In one embodiment, the search processor 240 includes resources for performing searches such as a Boundary Addressable Memory (BAM). The search processor 240 can search for the next table program entry to be processed by the table entry processor 202, a result from a lookup table stored in memory as directed by the table entry processor 202, or other information. One embodiment of this BAM is described in patent application Ser. No. 10/005,986, filed Nov. 7, 2001, titled, "Boundary Addressable Memory," which is incorporated by reference.

One particular advantage of the present invention is the inclusion of the cache and memory controller 230 in the services processor 110. The cache and memory controller 230 is coupled to main memory 104/108 and the cache bus 260. The cache and memory controller 230 is preferably large enough so that many applications can execute exclusively out of cache 230. The cache and memory controller 230 effectively hides the latency of memory access to the services processor 110. The cache and memory controller 230 are designed to optimize data across the memory bus and will return data out of order from memory if necessary. The cache and memory controller 230 may also be locked to enhance performance such as to ensure that cache includes all data structure components or locking the top of the hierarchy in cache to accelerate insertions. It should be understood that both the packet data as well as other state and control information may be stored in the cache 230. If lookup tables or action table program entries are stored in cache 230 or main memory 108, a memory access unit (not shown) adapted for the type of information being retrieved will be included in the services processor 110. The packet processing controller 200 will then use the memory access unit, such as a lookup table access unit or action table access unit to retrieve results from the lookup table or retrieve action entries.

The packet input unit 210 processes the packets as the services processor 110 first receives them. The packet input unit 210 is coupled to signal line 120 to receive packets from the Ethernet switch 106. The packet input unit 210 is also coupled to the cache and memory controller 230 by the cache bus 260 for storing the packets in the cache and memory controller 230. The packet input unit 210 stores the packet data into one or more free blocks in the cache 230. The packet input unit 210 is also coupled to the packet processing controller 200 by the control bus 250. The packet input unit 210 notifies the packet processing controller 200 that a new packet is being received. As soon as the first block has been filled or an end of packet is detected, the packet processing controller 200 assigns the packet a packet context 204 and initial table handle, and the other registers in the packet context 204 are cleared. The packet context is released for further processing by the packet processing controller 200.

Once a packet is released for further processing, packet processing controller 200 performs actions in a table specified by the initial table handle. These will typically be packet parsing operations such as extracting a field from the packet and putting the field into one or more key registers to construct a key.

The field extraction unit 212 is coupled to the cache and memory controller 230 by the cache bus 260 for reading data out of cache 230 and memory 104/108. The field extraction unit 212 is also coupled to the packet processing controller 200. The field extraction unit 212 is responsive to extract requests from the packet processing controller 200 and sends extract responses for further processing by the packet processing controller 200. The function of the field extraction unit 212 is to retrieve packet data from the cache, extract the portions of packets referenced or addressed by extract requests, and return the extracted data to the packet processing controller 200. If the packet processing controller 200 requests packet data from a portion of the packet that has not yet been stored in cache the processing of the requesting packet context will be suspended until the data is received.

The state access unit 214 processes state load and store requests from the packet processing controller 200. The state access unit 214 is coupled to the cache and memory controller 230 by the cache bus 260 for reading and writing data into and out of cache 230. The state access unit 214 is also coupled to the packet processing controller 200 to receive state change commands. More particularly, each packet context 204 preferably has a plurality of state registers and the packet processing controller 200 may maintain state tables. The data in the state tables is modifiable as is the data in the state registers. The state access unit 214 increases the processing throughput by retrieving the state information, updating and maintaining state data table information in response to instructions from the packet processing controller 200.

One particular advantage of the services processor 110 of the present invention is the ability to edit packets before they are output. The editing unit 216 is responsible for packet editing performed by the services processor 110. The editing unit 216 is coupled to the packet processing controller 200 and responsive to edit instructions received from the packet processing controller 200. The editing unit 216 is also coupled to the cache 230 to read and write data including packet data. For example, the editing unit 216 performs a variety of packet modification functions such as: inserting data in a packet, deleting data from a packet, overwriting data in a packet, adding or subtracting a constant, another piece of packet data or register value from data in a packet, recalculating checksums in a packet, performing hashing operations on fields in a packet, packet creation, packet replication, packet segmentation, and packet re-assembly. More specifically, exemplary packet modification operations that occur as part of the output process include: 1) Drop Packet—The drop packet instruction recycles the buffers used for the packet; 2) Output Packet—The output packet instruction causes the edit process to apply all accumulated edits and send it to the queue specified by the queue handle in the output instructions user data component; 3) Sync Edits—The sync edits instruction causes the edit process to apply all accumulated edits and sends it to the head of the input overflow queue; 4) Copy and edit—The copy and edit instruction creates a copy of the packet and sends it to the head of the input overflow queue, and cause the edit process to apply all accumulated edits and send it to the queue specified by the queue handle in the output instructions user data component; 5) Edit and copy—The edit and copy instruction causes the edit process to apply all accumulated edits and sends it to the queue specified by the queue handle in the output instructions user data component and creates a copy of the packet and send it to the head of the input overflow queue; and 6) Copy and Output—The copy and output instruction creates a copy of the packet, causes the edit process to apply all accumulated edits and sends it to the queue specified by the queue handle in the output instructions user data component. Once all packet editing has been performed on a particular packet, a queue instruction output by the editing unit 216 to the queue operations unit 218.

The queue operations unit 218 handles the ordering of packets before they are output. The services processor 110 groups or orders the packets into queues for output. Frequently accessed queue control blocks are preferably maintained in cache 230. The queue operations unit 218 is coupled to receive queue instructions once the editing unit 216 has processed the packets. The queue operations unit 218 also has the capability to reorder packet for outputting. This helps ensure that the packets are output in the order received. The queue operations unit 218 is coupled to the cache 230 to prepare the data for output and maintain the queues in the cache 230. The operations unit 218 also manages the length of each queue to shape traffic responsive to queue instructions.

Figure 3:
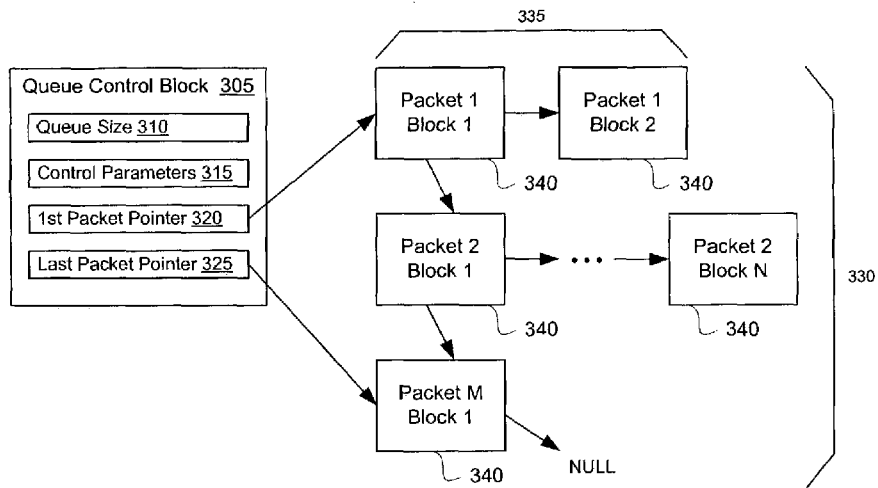
FIG. 3 is a diagram of a queue data structure according to an embodiment of the invention.
Figure 4:
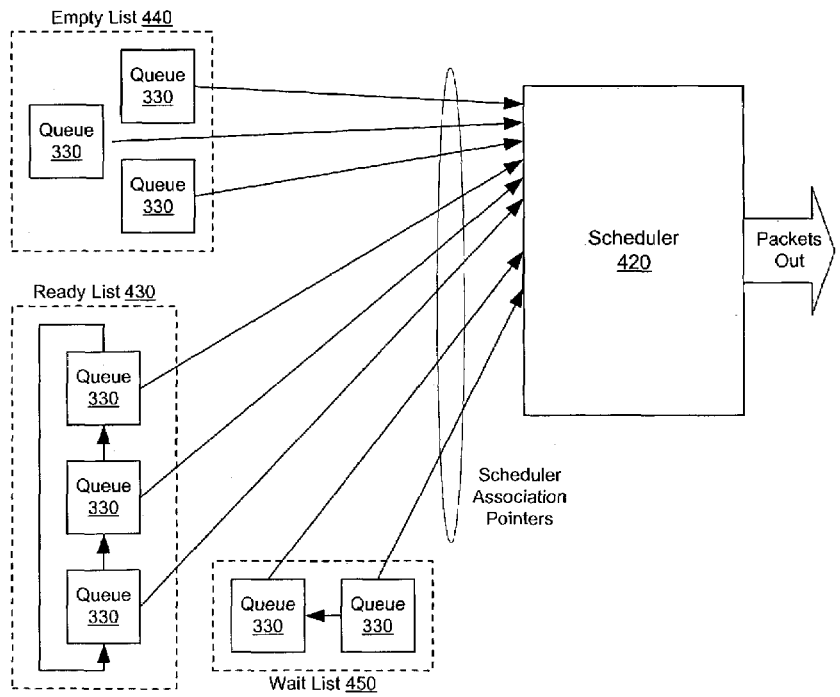
FIG. 4 shows a scheduler data structure according to an embodiment of the system.

FIG. 3 shows the structure of a queue 330 according to one embodiment, in which the queue 330 is implemented as a linked list of packets 335, which in turn are implemented as a linked list of blocks 340. With this structure, memory can be used efficiently to store a few large packets 335, many small packets 335, or a mixture of packets 335 of assorted sizes. A queue control block 305 is used to describe the queue 330. The queue control block 305 contains the queue size 310, control parameters 315, a first packet pointer 320, and a last packet pointer 325. The control parameters 315 may include data such as maximum queue size and/or RED/WRED parameters such as average queue size, exponential decay constants, and thresholds, which are used to manage the queue and are discussed in more detail below. The first packet pointer 320 indicates the location in the cache 230 of the first logical packet 335 in the queue 330. Each packet 330 is a linked list of one or more blocks 340 of data, and the first block 340 of each packet 335 points to the first block 340 of the next logical packet 340 in the queue 330. The last packet 335 in the queue 330 points to null. The last packet pointer 325 is optional and included to facilitate the insertion of new packets 335 into the queue 330. The queue 330 is referenced by the services processor 110 using the address of the queue control block 305, a queue handle.

The queue 330 is operated on using queue instructions, which include: creating a new queue, adding or removing a packet from the queue, destroying a queue, and flushing a queue to remove all packets associated with it. For example, an operation that modifies an existing queue 330 is performed by reading the queue 330 into the queue operations unit 218 or the editing unit 216, which then modifies the queue 330, and writes the modified queue 330 to the cache 230. Additionally, creating a new queue 330 is performed by assembling an empty queue 330, initializing the queue's queue control block 305, and then writing the new queue 330 to cache 230. When these operations are performed on a queue 330, the data in the corresponding queue control block 305 are updated or initialized as required. For example, when a packet 335 is added to a queue 330, the queue depth is checked. Congestion avoidance algorithms like Random Early Detection (RED) can be performed when packets 335 are added to a queue 330. These functions provide a high level of flexibility for creating queues 330.

To avoid having all of packet memory consumed by a single queue 330, the queue operations unit 218 implements a packet discard algorithm. The control parameters 315 in the queue control block 305 contain a maximum size. When a new packet 335 is added to a queue 330, the current queue size plus the size of the packet 335 is compared to this maximum size. If adding the packet 335 to the queue 330 will cause it to exceed the maximum size, the packet 335 is dropped. However, hard queue size limits have been found to cause a problem akin to cache thrashing, which occurs when multiple packets 335 are dropped as the maximum queue size is reached, causing a burst of retransmissions, queue overflow, and more packet loss. This is referred to as a "Global Synchronization," and the classical solution to this problem is RED, which solves this problem by discarding packets randomly at a level below the maximum queue size. The RED algorithm estimates the average queue depth using a first order infinite impulse filter. The average queue size is then compared to the minimum and maximum thresholds. Packets are never dropped when the average queue size is below the minimum threshold, and packets are always dropped when the average queue size is above the maximum threshold. However, if the average queue size is between the minimum and maximum thresholds, the drop rate is proportional to the average queue size. The control parameters 315 in the queue control block 305 include the RED parameters for this algorithm, allowing the packet dropping behavior for each queue to be tuned separately.

Sometime after the packets have been added to a queue by the queue operations unit 218, the output scheduler 220 removes them and sends them to packet output unit 222. The output scheduler 220 is coupled to read and write data from the cache 230. The output scheduler 220 preferably uses a hybrid list/calendar queue to determine the priority for outputting the packets. Transmit shaping is accomplished by associating a group of queues with a scheduler. When a queue is associated to a scheduler its scheduling parameters are initialized. The output scheduler 220 supports multiple scheduling algorithms including: a prioritized scheduler where the scheduler serves the queues in strict priority order; a weighted fair scheduler where scheduler serves the queues in proportion to their weight; a dual token bucket scheduler; a rate limited scheduler; or a Earliest Deadline First (EDF) scheduler. Once scheduled, the packet output unit 222 retrieves the packets from cache and outputs then from the services processor 110. The packet output unit 222 is coupled to the cache 230 by the cache bus 260 and has its output coupled by signal line 122 to the Ethernet switch 106.

To effect transmit shaping, the queue control block 305 includes data fields corresponding to the queue's ready time, last transmit time, weight, and credit. In this context, credit is a measure of how much time the queue has earned by waiting, and weight is a measure of the queue's importance of priority in the scheduling. A queue's. credit and weight are initialized when the queue is allocated. When a new packet is added to an empty queue, the credit is calculated by multiplying the time since the last transmission by the queue's weight. This calculated credit is fixed at or below a predetermined maximum value to prevent the credit from becoming too large, which could in turn cause the queue to hog the system's resources for too long. Once a queue's credit is greater than the size of the next packet in the queue to be served, the queue is added to the list 430 of queues ready for service. When a queue is served, the packet at the head of the queue is removed from the queue, and the size of this packet is subtracted from the queue's credit. If the queue is empty after the packet is removed, the queue is removed from the ready list 430 and placed in the empty list 440. If the remaining credit is greater than the size of the next packet at the head of the queue, the ready time/last transmission time is set to be:

current time+(packet size−credit)/weight, and the queue is added to the wait list 450. Preferably, the wait list 450 is sorted by when each queue will have sufficient credit to send packet at head.

The scheduler 420 may be implemented as a "work conserving" scheduler, which always serves the next queue having data to send as soon as possible. This allows individual queues to consume more than their allocated bandwidth if other queues are not utilizing their full bandwidth. Alternatively, the scheduler 420 may be implemented as a "non-work conserving" scheduler, which will not serve a queue until or after the system clock has reached the scheduled transmission time. This scheme limits each queue to its configured rate. In another variant, the scheduler 420 reschedules queues based on the "deadline" of the packet at the head of the queue, called earliest deadline first (EDF).

Another feature of the scheduling system is that it is hierarchical. The output of a scheduler 420 may be associated with an output port of the services processor 110, or it may be associated with the input of another queue. In the former case, when a scheduler 420 serves a queue, the services processor 110 outputs the first packet of that queue over signal line 122. In the latter case, when a scheduler 420 serves a queue, the packet at the head of the queue is removed from the queue and added to the queue to which the output of the scheduler 420 is associated. This enables the queues to be organized hierarchically and thus allows for complex traffic shaping systems to be implemented. For example, a linear priority scheduler could be associated to an output port, and its highest priority input could be the output of a weighted fair scheduler that services all of the constant bandwidth traffic in the processor. The RED parameters of these queues could be set limit the throughput to the level paid for by an associated subscriber.

Figure 5:
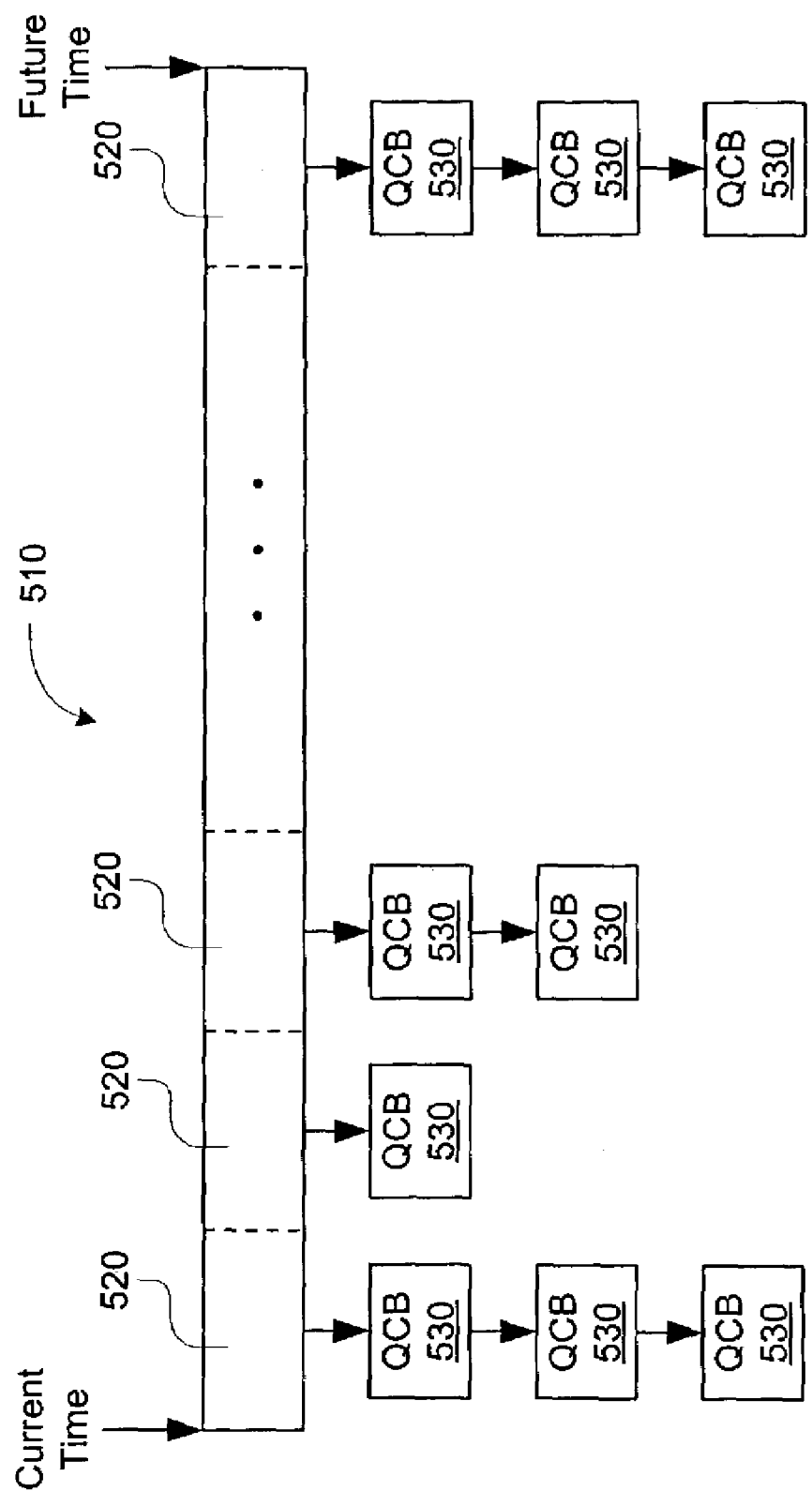
FIG. 5 is a representation of a calendar queue.

The output scheduler 220 organizes the queues 330 for output into a data structure called a priority queue. Priority queues can insert an entry anywhere in the queue based on a key value, where the key value corresponds to the entry's priority. Entries in the priority queue are sent out in the order determined by their priority. Priority queues can be implemented using heaps or calendar queues. FIG. 5 shows a basic calendar queue 510. The calendar queue 510 represents a range of delays for packet transmission from the current time until a future time—typically a constant value such as "end of year." This time range is divided into discrete buckets 520. A queue is represented by an entry 530 in the calendar queue 510. Each queue 330 is associated with a delay in terms of the system clock; hence, each entry 530 corresponding to a queue 330 is associated with a bucket 520 that contains the time range into which the delay for that queue 330 falls. All of the queue entries 530 within the range covered by a bucket 520 are included in a linked list associated with that bucket 520. In one embodiment, the entries 530 comprise the queue control blocks 305 of the associated queue 330. Empty queues 330 are stored in a separate list.

When the total number of entries 530 (or maximum number of entries 530 in a bucket 520) increases, either due to total size or a non-uniform distribution, the performance of the calendar queue 510 decreases. This can be corrected by "re-sizing" the calendar, i.e., dividing the calendar queue 510 into more buckets 520. One technique for increasing the number of buckets 520 is to divides the buckets 520 in half. Similarly, when the total number of entries 510 declines, performance can be increased by shrinking the calendar queue 510, i.e., decreasing the number of buckets 520 by merging them.

A simple calendar queue is implemented as an array of pointers, where each entry containing a valid pointer (either non-null or flagged by one or more state bits) is a pointer to a secondary data structure that represents a bucket. The bucket is typically implemented as a sorted linked list or a sorted array. When the number of items in the list is small, the highest priority item can be found with a simple priority encoder. However, this method becomes impractical when the size of a calendar queue is large. An alternative implementation for a calendar queue is to use a secondary data structure comprising a set of hierarchical bit masks and a pointer array. This structure can accelerate insertion of entries into the calendar queue.

Figure 6:
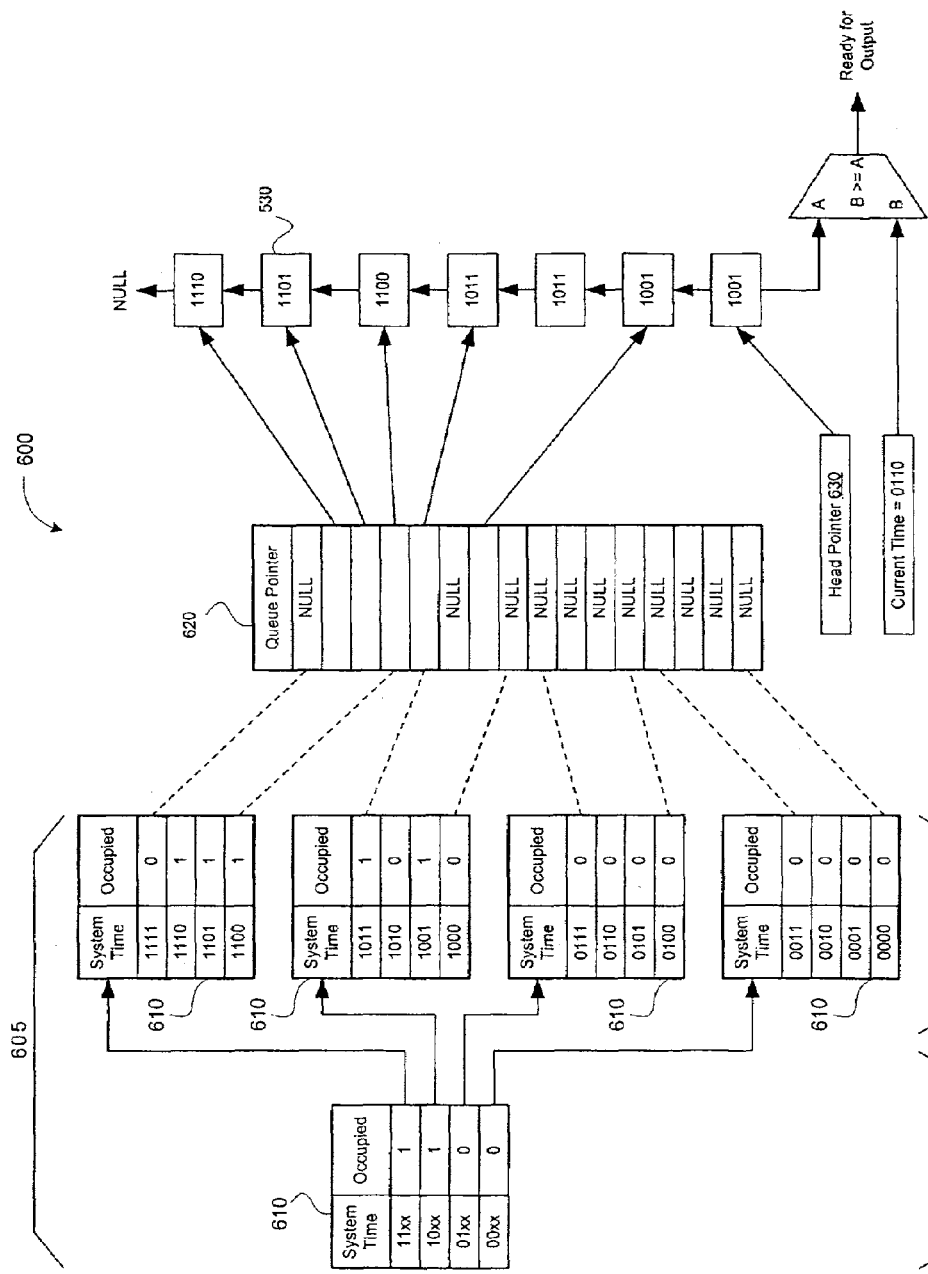
FIG. 6 is one embodiment of a data structure for implementing a hybrid list/calendar queue priority scheme.

To further implement the scheduling scheme of the present invention, a secondary data structure 600 is formed that comprises a set 605 of bit maps 610 arranged into a hierarchy and a bucket pointer array 620. A simplified example of this structure 600 is shown in FIG. 6; however, additional levels could be added to the hierarchy 605 of bit maps 610. Each bit map 610 in the lower layer is associated with one of the buckets 520 in the calendar queue 510. These lower layer bit maps 610 are used to track the occupied state of their associated buckets 520 in the calendar 510, and each contains a system time for the bucket 520 and a status bit that indicates whether the bucket 520 is occupied. The upper layer bit maps 610 in the hierarchy track the state of a "bucket group." In the example of FIG. 6, a bucket group is four consecutive buckets 520. If any member of the bucket group is occupied, the corresponding bit in the upper layer bit map is set to "occupied." In this example, two levels of two-bit maps are used for a calendar queue that has sixteen buckets.

In addition to being associated with a bucket 520, each bit map 610 in the lower layer is associated with the bucket's corresponding pointer in the bucket pointer array 620. Each pointer in the array 620 points to the last queue control block 530 in the list of scheduled queue control blocks 530 in the corresponding bucket 520. As will be appreciated, this configuration of bitmaps 610 with the pointer array 620 accelerates insertion of entries into the calendar queue and simplifies insertion of queues in FIFO order into a bucket 520.

A queue is added to the calendar queue 510 by linking its queue control block 530 into the linked list of queue control blocks 530. To place the queue in the correct bucket 520, the system time corresponding to the desired bucket 520 is associated with the queue control block 530, and the queue control block 530 is inserted into the list according to that value. When a queue control block 530 is added to a calendar queue, the first step is to read the entry in the pointer array 620 indexed by the system time (the "insert pointer"). If this pointer is not NULL (all ones used as a reserved value) then there are already queue control blocks 530 in this bucket 520, and the new queue control block 530 can be added to the end of the blocks 530 for this bucket 520. Specifically, the "next queue" pointer in the new block 530 is set to the value of the "next queue" pointer of the block 530 pointed to by the insert pointer. The "next queue" pointer of the block 530 pointed to by the insert pointer is then modified to point to the new block 530, and then the insert pointer is updated to point to the new block 530. If the insert pointer is NULL, the bit maps 610 are used to find the block 530 having the next smaller system time. First, the insert pointer is set to point to the new block 530, and then the lower layer bit map 610 is updated. The correct bit map is selected using the upper bits of the system time as an index into the array of third level bit maps. The lower bits of the system time of the new block 530 will be decoded to figure out which bit to set to change the state of the selected bucket 520 to "occupied." The bit map 610 is then checked to see if there is a non-empty bucket 520 with a system time smaller than the system time of the new block 530. The occupied bits in the upper layer bit maps 610 are also set as needed.

Accordingly, this data structure 600 is used to index the queues in the calendar queue 510 organized as a list of queue control blocks 530 that determines the order of output of the corresponding queues. Additionally, the queue control blocks 530 are organized by their system times according to the calendar queue 510, and those having the same system time (i.e., are in the same bucket 520) are adjacent. A head pointer 630 points to the queue control block 530 having the highest priority in the calendar queue 510. Once the system time reaches the time of the queue to which the head pointer 630 points (i.e., when the system time is greater than or equal to the times associated with the queue control block 530), that queue's data packets can be outputted.

When a queue is outputted, its queue control block 530 is removed from the list. Removal of this queue control block 530 is performed by updating the head pointer 630 to point to the second highest priority queue control block 530 in the list. The queue control block 530 at the head of the queue is preferably cached on chip. In one implementation, eight classes of service are supported for each port, and the queue control block for each class is cached in a RAM. Comparators are implemented to detect accesses to the cached queue control blocks 530 for queue insert operations. All eight cached queue control blocks 530 for a port are stored in a single block RAM, simplifying the access to the system time. In one embodiment the bucket pointer array 620 is divided into segments equal to the cache line size. The bit maps 610 are also sized to fit in a single cache line. This sizing of the scheduler data structure components will interact with the cache replacement algorithm to ensure that frequently accessed components including the upper layers of the bit map hierarchy will be likely to be in cache at all times. A cache locking mechanism can also used to ensure that the bitmaps and bucket pointer array that correspond to the current system time are in cache. In another embodiment, all of the bit maps are locked in cache. Both embodiments may additionally prefetch the next portion of the data structure corresponding to the current system time while there is still one queue control block in the current bucket at the head of the calendar queue.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

We claim:

1. A computer-readable medium encoded with a data structure to implement a calendar queue of queue control blocks, each queue control block associated with a set of data packets to be outputted from a network services processor, the data structure comprising:

a hierarchy of bit maps having at least an upper layer and a lower layer, each bit map on the lower layer associated with a bucket of the calendar queue; and a bucket pointer array including a pointer for each bucket, the bucket pointer array associating the queue control blocks with a bucket in the calendar queue.

2. The computer-readable medium of claim 1, wherein each upper layer bit map is associated with a group of lower layer bit maps and indicates the occupied status of any bucket corresponding to the associated lower layer bit maps.

3. The computer-readable medium of claim 1, wherein each queue control block is further associated with an output time relative to a system time, and each queue control block is associated with the bucket corresponding to the queue control block's output time.

4. A method to schedule data packets for output by a services processor, the method comprising:

organizing the data packets into a plurality of queues;

scheduling the plurality of queues for output according to a calendar queue, the calendar queue defined by a data structure comprising:

a hierarchy of bit maps having at least an upper layer and a lower layer, each bit map on the lower layer associated with a bucket of the calendar queue, and a bucket pointer array including a pointer for each bucket, the bucket pointer array associating the queues with a bucket in the calendar queue; and outputting the queues according to the calendar queue.

5. The method of claim 4, wherein each queue is identified by a queue control block, and the queues are represented in the calendar queue by their associated queue control block.

6. A device to schedule data packets for output according to a calendar queue, the device comprising:

a queue operations unit for organizing the data packets into a plurality of queues;

a memory for storing a data structure that defines the calendar queue, the data structure comprising:

a hierarchy of bit maps having at least an upper layer and a lower layer, each bit map on the lower layer associated with a bucket of the calendar queue, and a bucket pointer array including a pointer for each bucket, the bucket pointer array associating the queues with a bucket in the calendar queue; and an output scheduler for scheduling the plurality of queues for output according to the calendar queue, wherein the output scheduler adds each queue to a bucket of the calendar queue.

7. The device of claim 6, further comprising:

a packet output unit that outputs the queues according to the calendar queue.

* * * * *